Aug. 29, 1950     J. H. IRION     2,520,408
LAWN EDGING DEVICE
Filed Sept. 29, 1949     2 Sheets-Sheet 1
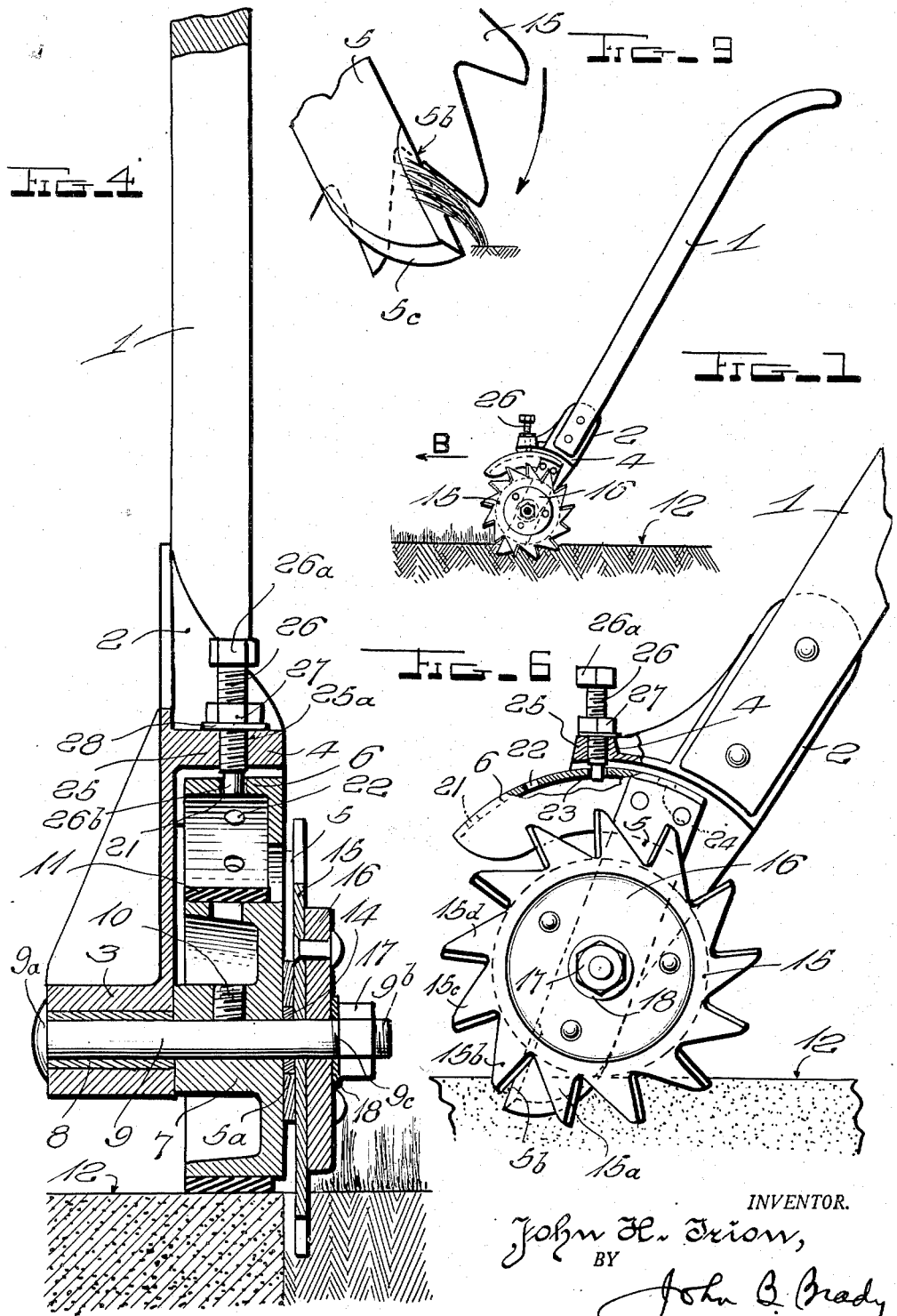
INVENTOR.
John H. Irion,
BY John B. Brady
ATTORNEY Aug. 29, 1950 J. H. IRION 2,520,408
LAWN EDGING DEVICE
Filed Sept. 29, 1949 2 Sheets-Sheet 2
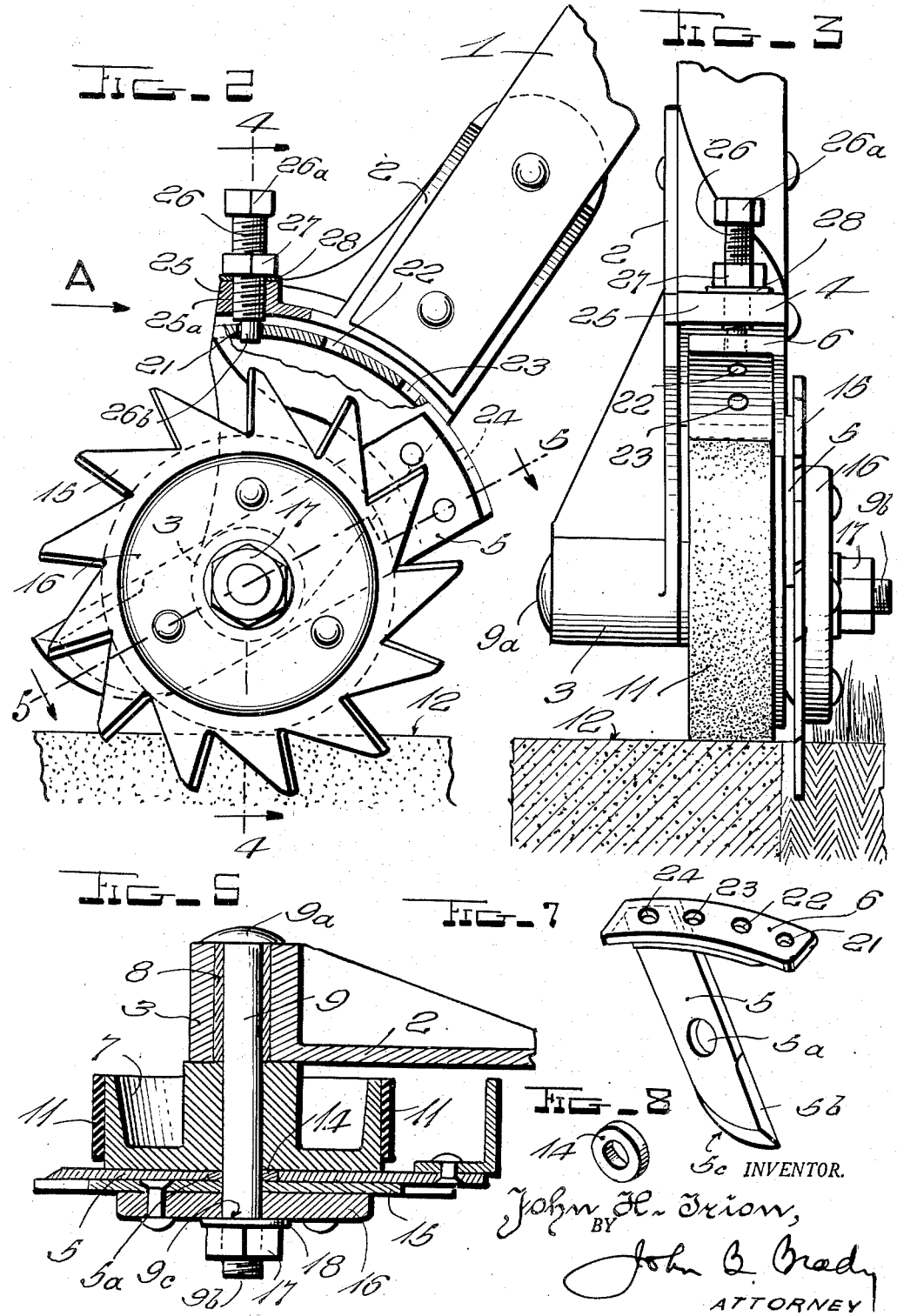
INVENTOR.
John H. Irion,
BY
John B. Brady
ATTORNEY Patented Aug. 29, 1950

2,520,408

UNITED STATES PATENT OFFICE 2,520,408

LAWN EDGING DEVICE

John H. Irion, Shreveport, La.

Application September 29, 1949, Serial No. 118,572

8 Claims. (Cl. 56—256)

My invention relates to lawn edging devices, and more particularly to an improved construction of adjustable lawn edger adapted to perform a highly precise cutting operation for neatly trimming the edge of a lawn.

One of the objects of my invention resides in the construction of a lawn edger including a cutting wheel and an adjustable knife arranged adjacent thereto and coacting with the cutting wheel in performing a lawn edging operation as the cutting wheel is advanced along the edge of the lawn.

Still another object of my invention is to provide an arrangement of rachet controlled adjustable knife coacting with a lawn edging wheel, by which the knife may be adjusted to selected angular positions.

Still another object of my invention is to provide an arrangement of rachet mechanism for adjustment of the cutting blade of a lawn edger, by which the cutting blade may be oriented out of the tractive position while the edger is being moved from a storage location to the lawn edging location.

Still another object of my invention is to provide an orientatable adjustment for a cutting blade of a lawn edger which is operative to perform a scissorlike cutting operation in coaction with a toothed cutting wheel at different elevations depending upon the growth of lawn to be edged.

Other and further objects of my invention reside in the adjustable arrangement of cutting blade and wheel in a lawn edging device, as set forth more fully in the specification hereinafter following, by reference to the accompanying drawings in which:

Figure 1 is a side elevational view of the lawn edging device of my invention, showing the device in use in trimming the edge of a lawn; Fig. 2 is an enlarged side elevational view of the lawn edger, with parts broken away and shown in section, and illustrating the orientation of the cutting blade; Fig. 3 is a front view of the edger looking in the direction of arrow A in Fig. 2, and illustrating the cutting blade raised in position preliminary to the trimming of the lawn edge; Fig. 4 is a vertical sectional view through the lawn edger, substantially on line 4—4 of Fig. 2; Fig. 5 is a transverse sectional view taken substantially on line 5—5 of Fig. 2; Fig. 6 is a side elevational view with certain of the parts shown in section, and illustrating the cutting blade lowered to one of the intermediate adjustable cutting positions; Fig. 7 is a perspective view of the cutting blade and the adjustment means associated therewith; Fig. 8 is a perspective view of the spacing member which I employ for positively spacing the traction roller and cutting wheel for preventing binding of the adjustable blade therebetween; and Fig. 9 illustrates the scissorlike action which is obtained in shearing the growth at the edge of the lawn as the edger is advanced along the edge of the lawn.

The lawn edger of my invention has been found to be a distinct improvement over lawn edgers heretofore available in the art, by reason of the adjustability imparted to the cutting blade in coaction with a cutting wheel, which permits wide application of the tool or device in trimming lawns of varying growths. The cutting blade is mounted in spaced relation to a traction roller and a toothed cutting wheel in the structure of my invention, and may be adjusted to any one of a multiplicity of selected angular positions for coaction in different substantially horizontal planes with the cutting tooth of the cutting wheel associated with the cutting blade of the lawn edger. The adjustment mechanism is manipulated very simply, and may be adjusted at different times during the lawn edging operation to effect a trimming of the grass at the height desired. The blade may be adjusted through angular increments of approximately 20° over a range of approximately 30°–90°. This range of adjustment ensures retraction of the coacting blade, if desired, to a protected position during movement of the edger from a storage position to the lawn edging location. The range of adjustment also permits trimming of the lawn at selected heights in accordance with the terrain.

Referring to the drawings in detail, reference character 1 designates the handle of the edging tool or device, which connects to a casting shown at 2, which is shaped to provide a horizontally extending journal housing 3, sufficiently spaced below the segmentally disposed projection 4 of casting 2 to permit the introduction of the adjustable cutting blade 5 and the substantially arcuate rachet plate or angle member 6 associated therewith and also the traction roller represented at 7. The journal housing 3 is provided with a horizontally extending cylindrical bushing 8, serving as an elongated bearing through which a headed bolt member 9 projects on a substantially horizontal axis. The headed bolt member 9 has a head 9a thereon, which confines the bolt member 9 against the end of the journal housing 3 and enables the screw-threaded end 9b of bolt member 9 to project beyond the opposite side of the tool. The bolt member 9 constitutes a shaft on which the traction roller 7 is keyed by means of a set-screw 10, so that traction roller 7 revolves with bolt member 9, constituting the rotary shaft of the device.

The traction roller 7 is provided with a tired surface 11, adapted to roll along the edge of the lawn, around flower beds, etc., or along a cement walk, represented by the solid surface 12 in the drawings. The bolt member 9, after extending through traction roller 7, extends through the spacing member 14 which fits within the circular aperture 5a in the adjustable cutting blade 5. The spacing member 14 may be formed from hardened steel to provide a positive spacing means between the side of the traction roller 7 and the side of the cutting wheel shown at 15. The cutting wheel 15 has a toothed periphery carrying a multiplicity of substantially radially extending cutting edges which I have represented at 15a, 15b, 15c, 15d, etc. These cutting edges are chamfered inwardly toward the traction roller 7, and may be readily sharpened from time to time. The cutting wheel 15 is carried by a hub plate 16 mounted over the screw-threaded end 9b of bolt member 9. The screw-threaded end 9b of bolt member 9 has the screw threads thereof terminate abruptly at approximately the position designated at 9c, so that the securing nut 17 which is engaged over screw threads 9b and moves against lock washer 18, jams at that position, which ensures the assembly of hub plate 16 in association with cutting blade 5 and traction roller 7, but ensures against the tightening of the side of cutting wheel 15 against cutting blade 5 to such an extent that cutting wheel 15 and traction roller 7 might jam and frictionally bind. The spacing member 14 ensures against a frictional bind between cutting wheel 15 and the side of traction roller 7.

The substantially arcuate plate 6 is provided with a plurality of spaced apertures which I have represented at 21, 22, 23 and 24 in Fig. 6, which are so spaced as to permit adjustments of cutting blade 5 through increments of approximately 20°. The substantially arcuate shaped ratchet plate 6 is orientatable beneath the laterally extending, segmentally shaped projection 4 of casting 2, and beneath the hub portion 25 formed on the end thereof. The hub portion 25 is internally screw-threaded at 25a to receive the screw-threaded member 26 having an engaging head 26a on the upper end, and an unthreaded pin projection 26b on the other end. A locknut 27 is engaged over the screw-threaded member 26, so that when screw-threaded member 26 is screwed to projected position with pin 26a projecting through in one of the selected apertures 21, 22, 23 or 24 in the rachet plate 6, locknut 27 abutting against lock-washer 28 may be screwed firmly in position for locking the screw-threaded member 26 in predetermined position with respect to the ratchet plate 6, for maintaining cutting blade 5 in a selected position. Change in the angular position of cutting blade 5 is very simply accomplished by loosening locknut 27 and retracting screw-threaded member 26, freeing the rachet plate 6 and allowing the cutting blade 5 to be moved to the desired angular position.

The cutting blade 5 has a linear cutting edge 5b ground at one side thereof, and a curved cutting edge 5c ground at the other side thereof. The ground edge 5c of cutting blade 5 coacts with the ground edges 15a, 15b, 15c, 15d, etc. of cutting wheel 15 for performing a scissorlike shearing operation on the grass blades, as more clearly represented in Fig. 9, as the traction roller progresses in the direction of arrow B in Fig. 1.

It will be observed that the cutting blade 5 is readily orientatable to any selected position within a range of approximately 30°–90°, in accordance with conditions encountered for different growths of grass, or for purposes of protecting the ground edge of the cutting blade as the device is rolled from a storage position to the trimming location, or vice versa.

I have found the construction of the device of my invention highly practical in manufacture and production, but I realize that modifications and changes may be made and I desire that it be understood that no limitations upon my invention are intended other than may be imposed by the scope of the appended claims.

What I claim as new and desire to secure by Letters Patent of the United States, is as follows:

1. A device for trimming the edges of lawns and the like comprising a handle member, a fitting carried at the end of said handle member and having a shaft projecting substantially horizontally adjacent the end thereof, a segmentally shaped projection on said fitting above said shaft, a traction roller carried by said shaft, a cutting blade angularly adjustable about said shaft and terminating at the upper end thereof in a segmentally shaped angle member extending beneath said segmentally shaped projection on said fitting above said shaft and having a cutting edge on the lower end thereof, said segmentally shaped angle member having a multiplicity of spaced perforations therein, a screw-threaded member carried by the projection on said fitting and selectively projectable through a selected perforation in said segmentally shaped angle member for maintaining said cutting blade in a predetermined angular position, and a cutting wheel secured on said shaft in a position adjacent said cutting blade, said cutting blade having a multiplicity of substantially radially projecting cutting teeth thereon coacting in scissorlike manner with said cutting blade as said device is moved on said traction roller.

2. A device for trimming the edges of lawns and the like as set forth in claim 1 including a positive spacing member disposed between the side of said traction roller and said cutting wheel for preventing binding action between said traction roller and said cutting wheel and enabling said cutting blade to be oriented therebetween.

3. A device for trimming the edges of lawns and the like comprising a handle member, a casting secured to the end of said handle member and terminating in a hub-like support for a substantially horizontally extending shaft, a substantially segmentally shaped, laterally extending projection on said casting above said hub-like support and terminating in a vertically extending internally screw-threaded hub member substantially vertically aligned with said hub-like support, a screw-threaded member extending through said internally screw-threaded hub member and terminating in a projecting pin, a horizontally extending shaft journalled in said hub-like support, a traction roller carried by said shaft in a position below said substantially segmentally shaped laterally extending projection on said casting, a cutting blade mounted for angular adjustment around said shaft adjacent said traction roller and terminating in a substantially segmentally shaped angle member extending beneath the substantially segmentally shaped projection on said casting, a plurality of spaced perforations in said angle member adapted to be selectively engaged by the pin on said screw-threaded member for maintaining said cutting blade in a predetermined angular position, and a tooth cutting wheel confined on said shaft in a position adjacent said cutting blade with cutting edges on said tooth cutting wheel coacting with the cutting edge on said cutting blade in the selected position on said cutting blade.

4. A device for trimming the edges of lawns and the like as set forth in claim 3 in which a positive spacer is provided surrounding said shaft intermediate one side of said traction roller and said cutting wheel for positively spacing said cutting wheel from the side of said traction roller for allowing orientation of said cutting blade to a selected position without binding of said cutting blade with respect to said traction roller or said cutting wheel.

5. A device for trimming the edges of lawns and the like as set forth in claim 3 in which the substantially segmentally shaped angle member connected with said cutting blade is substantially longer than the substantially segmentally shaped laterally extending projection on said casting.

6. A device for trimming the edges of lawns and the like as set forth in claim 3 in which the perforations in the substantially segmentally shaped angle member connected with said cutting blade are spaced in angular distances of approximately 20° for allowing the selective setting of said cutting blade in any one of the 20° positions relative to said cutting wheel.

7. A device for trimming the edges of lawns and the like as set forth in claim 3 in which said cutting blade may be oriented through distances of approximately 30°–90°.

8. A device for trimming the edges of lawns and the like comprising a handle member, a fitting carried by the end of said handle member and terminating in a substantially horizontally extending hub-like support at the end thereof, a substantially horizontally extending shaft journalled in said hub-like support, a traction roller carried by said shaft, a laterally extending, substantially segmentally shaped projection on said fitting substantially above said shaft, a cutting blade having a cutting edge at one end thereof and a laterally extending substantially segmentally shaped angle member at the other end thereof projecting beneath the substantially segmentally shaped projection on said fitting, means extending between said substantially segmentally shaped projection on said fitting and the substantially segmentally shaped angle member on said cutting blade for selectively fixing said cutting blade in any one of a plurality of selected angular positions, and a cutting wheel confined on said shaft adjacent said cutting blade, said cutting wheel having tooth cutting edges thereon coacting with the cutting edge on said cutting blade.

JOHN H. IRION.

No references cited.